(12) United States Patent　(10) Patent No.: US 6,904,930 B2
Susko　(45) Date of Patent: *Jun. 14, 2005

(54) ON-BOARD FUEL INERTING SYSTEM

(76) Inventor: Kenneth Susko, 30 Amethyst St., Elmont, NY (US) 11003

( * ) Notice: Subject to any disclaimer, the term of this patent is extended or adjusted under 35 U.S.C. 154(b) by 0 days.

This patent is subject to a terminal disclaimer.

(21) Appl. No.: 10/463,764

(22) Filed: Jun. 18, 2003

(65) Prior Publication Data
US 2004/0035461 A1 Feb. 26, 2004

Related U.S. Application Data

(63) Continuation-in-part of application No. 09/994,714, filed on Nov. 28, 2001, now Pat. No. 6,634,598.

(51) Int. Cl.⁷ .............................................. G05D 7/00
(52) U.S. Cl. ..................................... 137/209; 220/88.3
(58) Field of Search ......................... 137/209; 220/88.3

(56) References Cited

U.S. PATENT DOCUMENTS 6,634,598 B2 * 10/2003 Susko ....................... 220/88.3

6,843,269 B2 * 1/2005 Verma et al. ............... 137/209

* cited by examiner

Primary Examiner—Gerald A. Michalsky
(74) Attorney, Agent, or Firm—Burns, Doane, Swecker & Mathis, LLP

(57) ABSTRACT

An inerting system is provided which is adaptable to inert the fuel tank of a vehicle, such as an aircraft. The fuel inerting system includes an oxygen detector, a source of an inert gas, a detector and a fiberoptic probe. The oxygen detector monitors oxygen partial pressure of vapors in an ullage volume of a tank. The source of an inert gas, such as a liquid nitrogen dewar, pressure swing absorption or hollow fiber membrane technology, is in valved communication with the ullage. The detector senses oxygen content in the ullage and controls the flow of inert gas to the ullage to maintain a volume with a proportion of oxygen that will not support combustion. The specific fiberoptic probe enables monitoring oxygen content within the tank without introducing a source of electrical current.

12 Claims, 2 Drawing Sheets

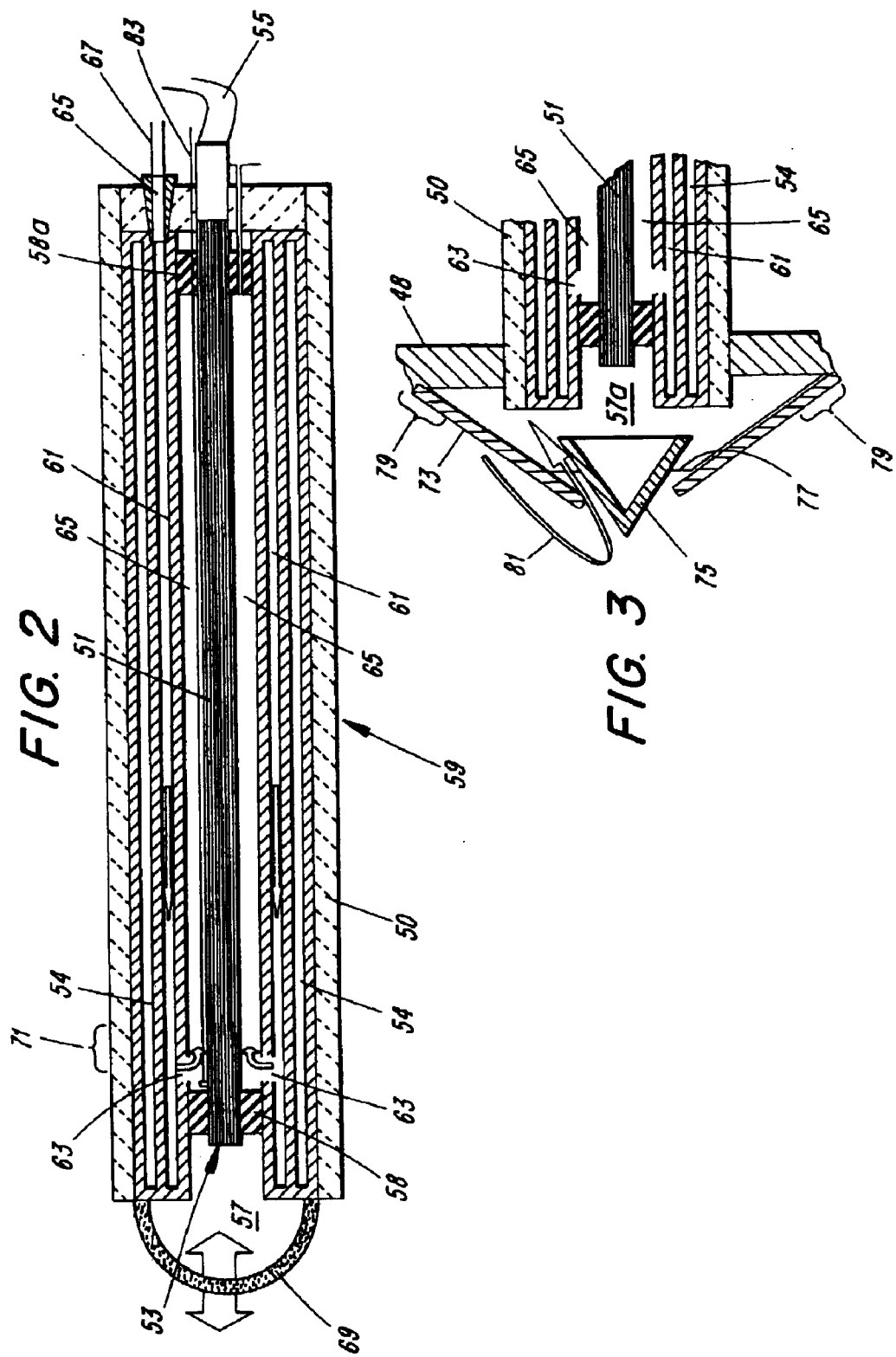

ON-BOARD FUEL INERTING SYSTEM

This application is a Continuation-in-Part of application Ser. No. 09/994,714, filed Nov. 28, 2001, now U.S. Pat. No. 6,634,598.

This invention relates to a novel system for inerting combustible and potentially explosive fuel supplies in vehicles such as aircraft. More particularly, this invention provides a novel nitrogen fuel inerting system that will fill the ullage (i.e., the vaporous volume within a fuel tank above the liquid fuel) of an aircraft fuel tank or other fuel tank with an inert gas that will not support combustion. The invention concomitantly provides a capability of actively monitoring the oxygen content of vapor and gas in the ullage of a fuel tank to maintain the inert status of the over-fuel vapors and enable efficient dispensing of the inert gas.

BACKGROUND AND PRIOR ART

Since 1959, there have been a number of explosions of the center wing tank on military and commercial aircraft reportedly resulting in deaths of as many as 550 persons. Those infrequent but continuing occurrences involving fuel tank explosions are believed to have possibly been caused by unknown sources of ignition, possibly initiated by conductive wires exposed to the explosive fuel vapor/air mixture in the tank. These accidents have added impetus to the search for an effective system for inerting flammable and potentially explosive vapors in fuel tanks, particularly of aircraft. Inerting systems using halogen-based gases have been known for use in military aircraft. But the use of halogen-based gases is not viable in commercial aircraft and in general aviation because of their effects resulting in ozone depletion. A non-halogen based system, moreover, would be advantageous in military applications as well because of the more environmentally friendly nature of an inerting system based on a non-halogenic gas.

A brief discussion of the history of the problem of center fuel tank explosions and of the growing interest in implementing an inerting system on commercial aircraft is found in *Air Safety Week*, Vol. 15 No. 16, Apr. 16, 2001, "*Fatal Explosion Highlights Hazard of Flammable Vapors in Fuel Tanks.*" The discussion in that article pointed out that, in particular, the center wing tank of commercial aircraft can reach high temperatures when the aircraft required to queue up on the hot tarmac of an airport at summer temperatures, and that such conditions have been linked to some explosions. The issue of *Air Safety Week* noted above also discusses a number of nitrogen based inerting systems that were considered by the Aviation Rulemaking Advisory Committee at its meeting of Apr. 4, 2001. Included among those systems was a brief discussion of the system of the present invention.

SUMMARY OF THE INVENTION

Accordingly, this invention provides a nitrogen inerting system for potentially flammable and explosive fuel-vapor mixtures that exist in fuel tanks, particularly in aircraft fuel tanks. However, it will be apparent that the systems of this invention are readily adaptable to inerting fuel tanks in any type of vehicle and hence this invention may find utility in various types of military vehicles or in vehicles intended for operation in a hazardous environment or under other circumstances where there is sufficient danger of fuel tank explosion or sufficient desire to negate such a possibility so as to justify the installation of the system. It is also apparent that the system of this invention could be also employed to inert a non-fuel tank environment such as a cargo hold, or to provide a fire suppression system for selected areas of the aircraft or other vehicle, In such an instance, the nitrogen gas to inert an area might be released only after the potential of fire is detected elsewhere on the vehicle. Hence, although this invention will be explained herein in the context of an onboard nitrogen inerting system for an aircraft center wing tank, it will be understood that the system may be adapted to other fuel tanks or to multiple fuel tanks on aircraft and other vehicles, and can further be adapted to create an inerted environment or supplemental fire suppression system in a volume other than a fuel tank. Most likely this system will be used principally as a fuel tank inerting system, will be simultaneously adapted additionally to provide a fire suppression system in other regions of the aircraft, such as a cargo hold.

In particular, the instant invention provides a system that provides an inert blanket of a nitrogen rich gas atmosphere to a fuel tank or other environment so as to inert that environment from the prospect of explosion. In a further aspect of this invention there is provided a system with safe and effective monitoring of the oxygen concentration (preferably measured as oxygen partial pressure) in the atmosphere in a tank or other area to be inerted such that nitrogen can be metered efficiently from a liquid nitrogen source to maintain the atmosphere at a desirably low oxygen concentration so that the potential of explosion is minimized or eliminated. Temperature of the tank can also be monitored further to assess the potentially explosive character of the tank contents. There is further provided an effective probe which can effectively monitor the oxygen content of the atmosphere within a fuel tank, and which can accomplish that monitoring function accurately without introducing a dancer that the probe itself can be a source of sparking that could initiate an explosion. In a special embodiment, the probe is a passive fiber optic probe that can be extended into the fuel tank or other environment to monitor oxygen content and provide a basis for controlling oxygen concentration. Because, in the particular embodiment of this invention, the output of the fiber optic probe indicative of oxygen concentration is temperature dependent, there is also provided herein a shroud or device to maintain the probe at a known uniform temperature in order to assure an accurate oxygen measurement can be obtained.

The system of the instant invention utilizes an on-board liquid nitrogen supply in the form of a dewar or similar liquid nitrogen-holding container which is suitably insulated to maintain the liquid nitrogen at reduced temperature for a long period. The container desirably is sized to provide a sufficient supply of nitrogen to blanket the fuel tank, for example the center wing tank or multiple fuel tanks of an aircraft, preferably several times over as will be explained below. The on board nitrogen supply is in valved fluid communication with the fuel tank or tanks or other environments to be inerted, most typically the aircraft's center wing tank. A passive fiber optic probe that extends into the tank monitors the oxygen partial pressure within the tank. The output from the probe can be fed to a spectrometer or similar instrument that is adapted to translate the analog output of the probe to a digital signal which can be fed to a suitable controller, such as a microprocessor-based controller. The microprocessor can then control valves through which nitrogen flows from the onboard nitrogen source to feed nitrogen to the tank as needed to maintain the over fuel atmosphere in an inerted condition. The apparatus can control that flow and maintain an inert condition by monitoring a signal from the probe and using software adaptations that will be understood by those skilled in the art to enable the microprocessor to control the nitrogen content in the ullage of the tanks.

The accurate probes contemplated by this invention provide an output signaling oxygen partial pressure that is temperature dependent, and hence the invention also provides a receptacle or shroud to provide a stable temperature environment which can be used in the case of a system which is subject to the widely varying temperatures the will be encountered by a commercial aircraft. That is, the invention provides a heated receptacle or well to encase the probe extending into the fuel tank to maintain the probe at a sufficiently constant temperature to assure accurate oxygen readings by the probe. The fuel tank is supplied with a suitable relief valve that will expel the over-fuel gas-vapor mixture as nitrogen is metered from the on board supply to the tank. The overall system, however can be operated at relatively low peak pressures of 20 psi over ambient or less. The system of this invention accordingly overcomes the disadvantages of some suggested systems that require compressors on board to effect nitrogen separation from air.

Accordingly, in summary, the instant invention provides an on-board fuel inerting system for a vehicle subject to electrical sparking or other intrusion of potentially explosive occurrences within a fuel tank of the vehicle which comprises: (a) an oxygen partial pressure detector maintained in contact with the vapors in the ullage of the fuel tank; (b) a source of inert gas maintained on-board the vehicle in valved communication with the ullage volume of the fuel tank; and (c) a controller responsive to the detection of a partial pressure of oxygen within said ullage volume that is higher than some predetermined level to cause inert gas to flow into the ullage volume from said source to establish the oxygen partial pressure below said predetermined level. In the preferred embodiments, the system is adapted to an aircraft using nitrogen gas as the inerting agent and using a fiberoptic oxygen-detecting probe which makes it possible to detect oxygen partial pressure within the tank without exposing the ullage volume to electricity and an additional source of sparking.

BRIEF DESCRIPTION OF THE DRAWINGS

The present invention will be further exemplified and explained with reference to the accompanying drawings which are as follows:

FIG. 2 is sectional view of a shroud or receptacle for a fiber optic probe in accordance with the present invention, the well or receptacle being adapted to maintain the probe at a relatively constant temperature to assure suitably accurate readings of the oxygen content of the tank being inerted.

FIG. 3 shows a baffle arrangement that can be employed as an alternative to the arrangement shown in FIG. 2 to create an atmosphere that will accurately reflect the oxygen concentration in the tank being inerted, yet afford an opportunity to shield the probe from being contacted by liquid fuel.

DESCRIPTION OF THE SPECIFIC EMBODIMENTS

Figure 1:
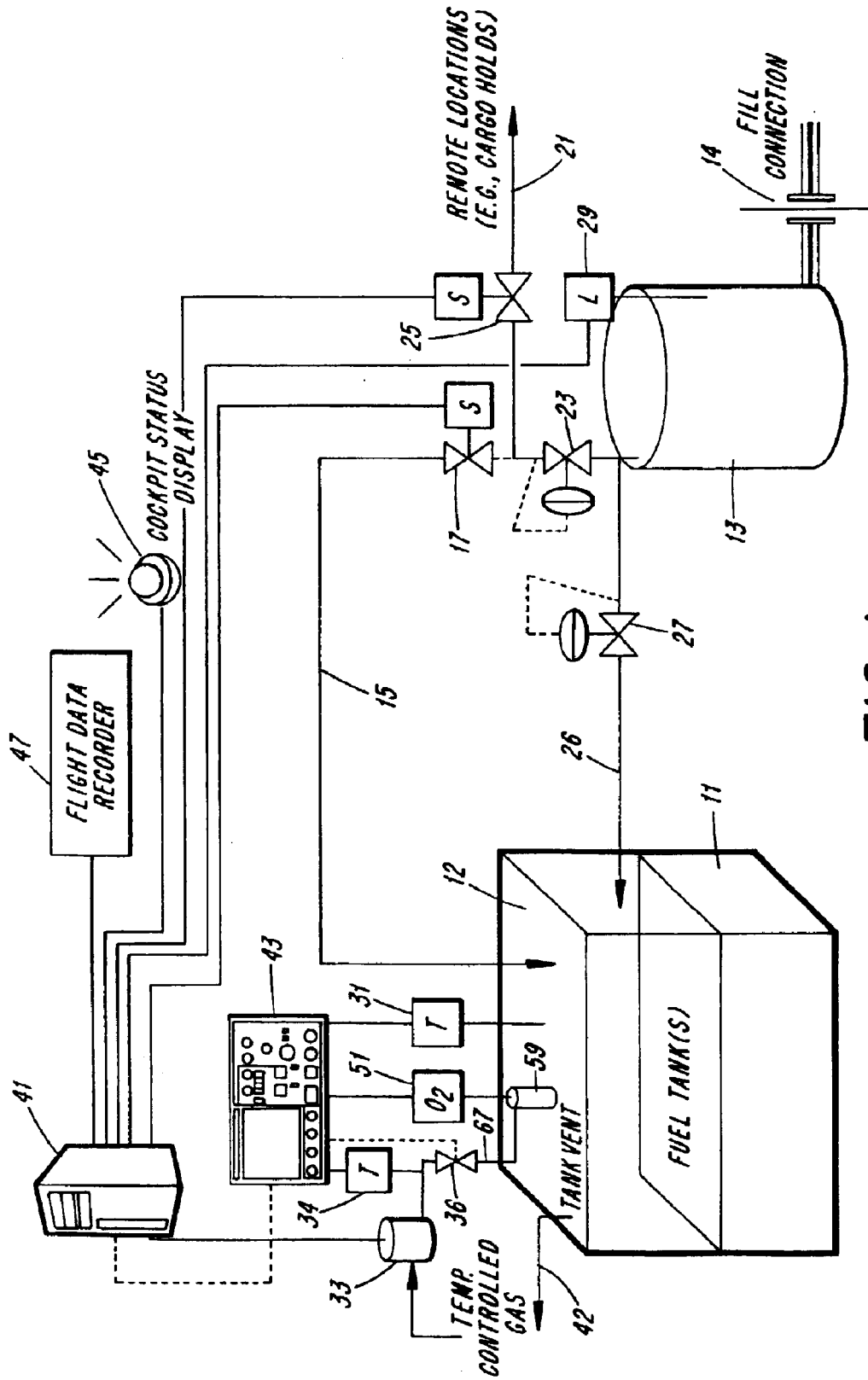
FIG. 1 is a schematic diagram of a system in accordance with this invention disposed to maintain an inerted atmosphere in the center wing tank of a commercial aircraft.

Referring to FIG. 1 there is shown schematically a fuel tank 11 having fuel in the lower portion thereof. The overfuel or ullage volume of the tank 12, also known as ullage, would accordingly be typically filled with an air-fuel vapor mixture which would very likely combustible and explosive if the fuel vapors were combined with ambient air. Nitrogen gas line 15 is capable of conducting nitrogen to the upper most portion of the tank, and is in valved communication with a source of nitrogen 13. Any suitable insulated container may be used, however, a dewar container of the type typically used to store liquefied gases is preferred. Such container may have, for example, a double wall with evacuated space between the walls and reflective or silvered surfaces. Although any suitable insulative type container for storing liquefied gas may be used, the nitrogen container shall be referred to as a dewar herein.

It should be noted that the source of nitrogen 13 could constitute other sources of nitrogen gas generating method such as pressure swing absorption (PSA) or hollow fiber membrane technology. An example of PSA or hollow fiber membrane technology is a Self Generating Nitrogen Servicing Cart available from Pacific Consolidated Industries LLP located in Santa Anna, Calif.

In accordance with a particular aspect of the invention the supercooled liquid nitrogen is maintained in a dewar or insulated container capable of holding about 100 gallons of liquid nitrogen. Such a container is capable of generating about 9300 cubic feet of nitrogen gas at approximately atmospheric pressure. Such an amount of gas would be enough to fill the center wing tank of a 747-type aircraft (which is about 2100 cubic feet by volume) more than three times over, Accordingly, the use of such a dewar even on such a large aircraft such as a 747 commercial jetliner would mean that the center wing tank could be inerted for as many as three flights on one supply of liquid nitrogen provided to the dewar.

A valve 17 such as a solenoid valve is provided in line 15 between the source of nitrogen 13 and the fuel tank 11. Valve 17 is controlled by the control system hereinafter discussed to feed nitrogen to the overfuel or ullage (ullage) volume of the fuel tank 11 when it is detected that the oxygen 9 concentration in the overfuel volume has climbed sufficiently high to make the ullage vapor mixture potentially explosive.

The source of nitrogen 13 is provided with a suitable fill connection 14 that terminates on the external skin of the aircraft of at another suitably accessible point on the aircraft to enable airport support personnel to refill the dewar from a liquid nitrogen supply truck or the like as needed.

Additional lines such as 15 can communicate from the nitrogen dewar to other fuel tanks on the aircraft. However, it is pointed out that the center wing tank of the aircraft is likely the prime candidate for this inerting operation.

Level detector 29 is an apparatus that detects the level of liquid nitrogen in the dewar. Output from the level 29 is communicated to the microprocessor-based controller signaling the need for filling the dewar when the nitrogen supply is depleted.

Line 21 is an alternate nitrogen gas carrying line that can be in communication with other portions of the aircraft, for example, cargo hold areas where fire may be a potential problem. Under such circumstance, control valve 25, for example another solenoid valve, and pressure regulated valve 23 can be operated to permit nitrogen gas to flood the regions in communication with line 21 thereby suppressing the fire hazards in those areas. The pressure regulator 23 may be a self-regulated valve that opens when the pressure differential between the upstream and downstream ports of the valve exceed the valve set point which may be adjusted to desirable operating pressures as will be understood by those skilled in the art. Inert gas is not provided through the cargo hold areas on a continuous basis, but is only provided if and when some potential fire hazard in those areas is detected and solenoid valve 25 is opened by the control system. Accordingly, it may or may not be necessary to deploy an oxygen detecting probe as discussed below in those cargo hold or other non-fuel tank regions, since the hazard in those areas will likely have been signaled by other than oxygen partial pressure. However, it will be apparent to those skilled in the art that deployment of an oxygen probe in any area for which oxygen may be supplied can be effective to inform the controller of the oxygen partial pressure. An oxygen detecting capacity may be deployed in the cargo hold area utilizing the probe discussed below and the constant temperature well or receptacle that maintains such probe at a sufficiently uniform temperature so that the probe is capable of accurately detecting oxygen partial pressure. It must be understood that an aircraft is subjected to a wide range of temperatures as it proceeds through the cycle of takeoff to high altitude and return to an airport and in accord with this invention it is desirable to maintain the oxygen measuring probes at relatively uniform temperature.

Turning now to the region of the fuel tank, the aspects of the control apparatus of the inerting system of the present invention will be discussed. In this context, it should be noted that lines which are solid on FIG. 1 indicate that the line is capable of transmitting fluid such as nitrogen gas or other gas streams as will be discussed herein. Lines that are shown as dotted indicators are intended to indicate that the lines do not carry fluid but are for communication and control purposes. Such lines capable of providing signals to detect pressures, temperatures and the like and feed those signals to the microprocessor control apparatus in accordance with the present invention.

Normally, the inerting system of this invention can operate at relatively low pressures, as low as about 20 or 25 psi over ambient pressure. Accordingly, pressure regulator valve 27 is a pressure relief valve that relieves any accumulation of pressure in the dewar and vents the inert gas through line 26 into the overfuel volume within the fuel tank. The pressure set point in valve 27 is typically higher than the setting in pressure regulator 23 since valve 27 is a relief port designed to relieve and valve 23 feeds inert gas to the fuel tank when there is at least some minimal pressure drop between the dewar and the fuel tank being inerted. This information is fed back to microprocessor controller 41, which may be a personal computer-type controller, so that valve 17 can properly be operated to meter nitrogen to the fuel tank when desired. The liquid nitrogen in the dewar can provide sufficient positive pressure to flow the nitrogen from the dewar to the tank when valve 17 is open and the pressure drop between the dewar and the tank exceeds the setting of valve 23. Tank 11 is preferably also provided with a vent line 42 that will release the overfuel gases of any type into the atmosphere when the pressure of those gases in the fuel tank exceeds a desirable maximum. If desired a valve may be inserted in that vent line to establish that pressure differential.

One key aspect of the system of the instant invention is oxygen probe 51 that extends through constant temperature receptacle 59 into fuel tank 11. Probe 51 serves to monitor the oxygen concentration as oxygen partial pressure in the fuel tank at all times. Simultaneously, the within the fuel tank is monitored by temperature sensor 31 which may be a thermocouple or other typical temperature sensor well know to those skilled in the art. Hence the microprocessor controller 41 is supplied with both temperature information and oxygen partial pressure information concerning the tank on a continuous basis. When the control system senses that oxygen partial pressure within the tank is approaching a potentially hazardous level in view of tank temperature, the control system can activate the nitrogen supply through the valves discussed above and can feed nitrogen to the overfuel volume of the tank, expelling gas through the tank vent until the desired low level of oxygen partial pressure is achieved.

The oxygen probes used in accordance with this invention are fiberoptic sensors which use chemical fluorescence which can be generated at the sensor tip to measure the partial pressure of oxygen. Hence, the sensors used in accordance with this invention do not include any current carrying wires extending into or near the center wing tank or any other fuel tank which is being monitored for the development of a potentially explosive air/fuel vapor mixture. The fiberoptic sensors are used in combination with a spectrometer to achieve real time measurement of oxygen partial fresh air in the ullage mixture over the fuel in tank 11. Optic sensors used in accordance with this invention are adapted from optic sensors presently used, for example, for respiration monitoring. These sensors typically consist of a reflective probe with a spectrophotometer or suitable monochromator 43 for wavelength specific analysis.

The probes which are illustrated as item 51 in FIG. 2 are available commercially. The probes operate by having optical fiber carry an excitation light produced, for example, by a blue LED to a sol-gel thin film coated on the membrane at the probe tip that extends into the atmosphere being monitored for oxygen partial pressure. Fluorescence generated at the tip is collected by the probe and carried by optical fiber to the detector (the spectrometer or monochromator 43). When oxygen in the sample being monitored diffuses into the coating, it quenches the fluorescence. The degree of quenching correlates to oxygen partial pressure level. The oxygen pressure measurement can be obtained in either a dry or wet gas environment. Hence by mounting the probes through the fuel tank wall so that the tip is exposed to the vaporous mixture in the fuel tank ullage, the probes can effectively provide a measurement of oxygen partial pressure within the tank.

An entirely suitable optic oxygen sensor which may be used in accordance with this invention is the FOXY Fiber Optic Oxygen Sensor currently manufactured and offered for sale by Ocean Optics, Inc, of Dunedin Fla. These FOXY Fiber Optic Sensors use the fluorescence of a ruthenium complex in a sol-gel to measure partial pressure of oxygen. A brief description of the mode of operation of these optic sensors follows:

First, a pulsed blue LED located in the spectrometer 43 sends light having a wave length of about 475 nanometers to an optical fiber. The optical fiber line 55 carries the light to the probe, the distal end of which is exposed to the atmosphere to be measured. The distal end of the probe tip consists of a thin layer of hydrophobic sol-gel material that extends within the fuel tank being monitored for oxygen content. A ruthenium complex is trapped in the sole gel matrix at tip 53 effectively mobilized and protected from water. The light from the LED communicated over fiberoptic fiber lines to the probe tip excites the ruthenium complex which fluoresces, emitting energy at about 600 manometers wave length. If the excited ruthenium complex encounters an oxygen molecule, there is a decrease or quenching of the fluorescent signal. The degree of quenching correlates to the level of oxygen concentration or oxygen partial pressure in the thin film, which is in dynamic equilibrium with the oxygen in the sample, in this case the volume 57. The energy is collected by the probe and carries through the return light conductive fibers in fiberoptic line 55 to the spectrometer 43. An A–D converter within spectrometer 43 converts this analog data to digital data, which is fed to a microprocessor, for example of the type in a personal computer and can then be displayed using suitable software. Ocean Optics provides such software as OOISENSORS software.

Temperature, however, is known to affect the fluorescence decay time, the fluorescence intensity, and the collisional frequency of the oxygen molecules with the fluorophore in the tip of probe 51. Temperature also affects the diffusion coefficient of oxygen and the solubility of oxygen in the samples. Accordingly, it is necessary for best results to maintain the sample at a constant temperature that varies no more than about +/−3° Centigrade, preferably no more than +/−1° Centigrade. In view of the wide temperature variations to which center wing tanks are subject, it is highly desirable than when oxygen probes such as those preferred by this invention are used, that they be deployed into the center wind tank using a shroud or receptacle that enables maintenance of the probe under temperature conditions that are sufficiently uniform to assure accuracy of the oxygen partial pressure measurement. Uniform temperature of the probe is achieved using a shroud or uniform temperature environment which can use temperature controlled gas or an electric heater to maintain the desired uniform temperature. Shown in FIG. 1 is a source of temperature-controlled gas 33 which in the illustrated embodiment may be a manifold containing for example waste exhaust gases from the aircraft engine. Line 67 which is suitably insulated conducts the temperature controlled gas from the source 33 to shroud 59 as will be more particularly discussed below in connection with the shroud embodiment. A temperature sensor 83 senses the temperature at the furthest point of oxygen sensor 51 and regulates that temperature by regulating the operation of a suitable proportional valve 36 which can be controlled to mix gas from the temperature controlled source and ambient air to achieve the desired gas temperature input to the shroud. Suitable valves are those sold under the Sentronic trademark by Asco Pneumatic Controls of Fort Mill, S.C.

Fiberoptic probes which may be used to determine oxygen partial pressure in fuel tanks using the apparatus of this invention are further described in the following articles which are incorporated herein by reference:

1. Krihak, M. et al., A *Highly Sensitive, All Solid State Fiber Optic Oxygen Sensor Based on the Sol-Gel Coating Technique*, Electronics Letters 1996, Vol. 32, No. 3.
2. Wang, W. et al., *Applying Fiber Optic Sensors for Monitoring Dissolved Oxygen, Sea Technology*, March 1999, Vol. 40, No. 3, pp. 69–74.
3. Krihak, M, et al., Fiber Optic Sensors Based on the Sol-Gel Coating Technique, Chemical, Biochemical and Environmental Fiber Sensors VIII, 1996, Vol.2836, pp. 87–98,
4. Sharihari, M. R. et al., Ormosil Thin Films For Chemical Sensing Platforms, Chemical, Biochemical and Environmental Fiber Sensors IX, Vol. 3105, pp. 40–51.

These article represent disclosures of using these sensitive fiber optic probes and those of skill in the art will understand how these disclosed probes may be adapted to determine oxygen partial pressure in the center wing tank environment in accordance with the present invention.

In accordance with this invention, it may be desirable to extend more than a single probe into the center wing tank. For both safety and redundancy purposes, it is preferred to use at least two probes to accomplish effective monitoring of a single fuel tank.

The fiberoptic sensors of Ocean Optics, Inc. are specifically the FOXY Fiber Optic Oxygen Sensors may be used with the Ocean Optics LES-450 Blue LFD pulsed light source and the ST2000 Miniature Fiberoptics Spectrometer adapted for avionics use.

The signals indicating oxygen partial pressure are fed back to the spectrometer 43 as indicated. The spectrometers of Ocean Optics are adapted to operate using suitable software available from the company in a personal computer environment. Accordingly, the Ocean Optics system using fiberoptic probes provides a ready means of generating a digital signal indicating oxygen concentration within tank 11 for a microprocessor, e.g., a personal computer 41, which can be suitably then programmed to control and monitor nitrogen flow to the fuel tanks so that oxygen partial pressure does not exceed desirable levels. The data collected by the p.c. concerning oxygen concentration is also continuously fed to a flight data recorder 47 or "black box" typically maintained on commercial aircraft in the United States to enable tracking of malfunctions of the system after the fact. A cockpit status display light 45 with or without a display giving a current readout of oxygen partial pressure signals (not shown) to the pilot that the fuel level oxygen monitoring system is active and in operation when that is the case. Activation of the cockpit status light display will signal that the system is operative or inoperative, warning the pilot of the potential malfunction or nonresponse by the inerting system, and is generally a preferred status indicator for use with this system, although a constant readout of oxygen partial pressure may also be provided.

As indicated above, the fiber optic probes of the type recommended for use with the present invention must be kept within a band of temperature to assure accurate readings. The tolerance for temperature variation will depend upon the probe chosen and manufacturer's recommendations with respect to such matters should be heeded. The constant temperature environment of the probe is maintained by mounting the probe within an insulated receptacle or shroud that is actively maintained at an elevated temperature that is preferably at the upper end of the temperature range that the aircraft will be anticipated to encounter (which of course will be higher during summer seasons than winter). The shroud or receptacle may be heated by heated gas from, for example, the aircraft engines as illustrated below or using an electric resistance heater in order to keep the probe at the desirable constant temperature. Such a receptacle or shroud is shown in FIG. 2.

Referring now to FIG. 2, they are showing a gas-heated receptacle or shroud 59 which centrally mounts the fiber optic sensor 51. Overall, the shroud comprises a cylindrical member having a bore through which the fiberoptic sensor 51 may be centrally mounted using gas tight hermetically-sealed bushings such as 58 and 58a which may be plastic or metal in composition. Overall, the cylindrical shroud is comprised of several concentric regions, the outermost of which 54 is a vacuum chamber which serves to insulate the inner portions of the shroud from outside temperatures via conduction or convection. Concentrically, within the outermost annular vacuum chamber, which is sealed upon construction of the shroud, is a second concentric chamber adapted to receive heated gases, for example heated waste gases from the aircraft engines though heated gas line into port 65. Port 65 communicates with annular concentric chamber 61 into which the heated gases flow. Ports 63 permit the gas to flow from the chamber 61 to the central bore 65 of the shroud which surrounds the fiber optic sensor. A hermetically sealed feed through bushing 58a at the opposite end of the shroud centers the posterior portion of the probe. Hence, heated gas such as air, nitrogen or engine exhaust cases can be flowed through the heated air region, and thence into the bore to bathe the probe 51 with uniform temperature gas. Generally the probes in accord with this invention may be calibrated and operated at temperatures that represent the high end of the temperature range to which the center wing tank can be subjected during preflight delays on the tarmac of a takeoff line, generally as high as about 120–140° Fahrenheit. The reason for this is that in many flights, the highest temperature to which the fuel will be subjected is the temperature on the runway either in summer or in winter. Accordingly, the system should be adjustable so that most the maximum target temperature at which oxygen partial pressure may be measured will generally be from about 30 to 40° F. in winter to 130–140° F. in summer. When programmed to operate at a suitable temperature within that range, the probe can be maintained at a temperature by heating the probe with hot gas or using an electrical resistance heater to remain accurate through the entire range of temperatures that the center wing tank can be reasonably expected to encounter. Hence in summer the planes may be standardized to measure oxygen partial pressure at 135° F.

When the probe is mounted in the fuel tank, it is desirable that a sensing and measuring portion of the probe extends to within the fuel tank volume. A heat-insulating layer 50 may be provided if desired which may be rigid plastic foam surrounds the shroud. Layer 50 can seal the probe to the fuel tank using a compression fitting in any suitable place in the anterior region of the shroud for example at the region indicated as 71 on FIG. 2. It will be noted that the shroud extends beyond the end 53 of probe 51 to create a volume 57 which can be more effectively heated by the shroud. The gas within volume 57 will have the same oxygen partial pressure as the tank into which the probe extends. A gas permeable shield 69 which may be a metal screen or a gas permeable foam or fabric structure surrounds volume 57 and protects the probe from being contacted by liquid fuel within the tank while assisting in stabilizing the temperature of volume 57. The double arrow signifies the ready gas permeability of shield 69.

Referring to FIG. 3 in which similar numbers are used to designate similar shroud parts, there is shown an alternative baffle structure that can be used to define a volume 57a which can be effectively heated by the shroud 59. The shroud is compression-fit through the wall 48 of the fuel tank being monitored. A baffle system comprising a first frusto-conical member 73 which concentrically mounts a conical baffle 75 with struts 77. The baffle system generally protects the tip of the probe from being contacted by fuel, yet permits the gas from the tank to freely circulate into volume 57a as indicated by arrow 81. Slots around the periphery of member 73 in the region of 79 precludes that liquid fuel will become trapped within the baffle system.

In operation, it is preferred to operate the fiber optic probes at a temperature at about 120–135 degrees Fahrenheit under summer conditions, but as low as 45–60 degrees Fahrenheit during winter. The range will depend on the maximum temperature anticipated. The probes of this invention can deliver accurate oxygen partial pressure measurement throughout such a range and indeed over even a broader range of temperatures. If such is the desired temperature of operation, it will be understood that a heated gas source may be continuously operated and contain a flow of gas at temperature to the heated area and leading to the heated air volume of the shroud. The use of a guard around the oxygen-measuring tip 53 of the probe in the form of permeable shield or a baffle system which can be configured by those of skill in the art can provide a volume that will equilibrate readily temperature-wise with the temperature of vapor and will substantially guard against the tip 53 being contacted by liquid fuel in the tank. The use of such a guard will therefore enable the measurement of oxygen content in the immediate vicinity of the oxygen-measuring region of the probe which is at tip 53 of the probe to be closely representative of the oxygen content of the entire tank, while providing protection against contact with liquid fuel. As indicated above, heated nitrogen can be used if desired, although the shroud can be suitably constructed to be reasonably sure that leakage of air will not pass into the fuel tank.

The operation of the overall system will be explained in the context of the probe and shroud discussed above. It has been generally recognized that the likely greatest potential danger of center wing tank (and other fuel tank explosions) probably occurs during the higher temperature seasons when aircraft spend time on the tarmac and fuel tank temperatures are in excess of 85 to 100° Fahrenheit or higher. Under those conditions, the system of this invention will flood the fuel tanks being controlled with nitrogen to minimize the explosive character of vapor in the ullage of those tanks. As the aircraft climbs out and temperature increases, the temperature of the fuel will decrease at altitude and nitrogen will flow into the tank through line 26 because pressure in the tank will decrease as the temperature and volume decreases. Line 42 is equipped with a check valve which permits outflow, but not inflow of atmospheric air, when the pressure in the tank is several psi higher than atmospheric air. Hence nitrogen will flow through self-regulated valve 27 to the tank when the pressure of gas in the ullage of the tank decreases by to whatever predetermined level is permitted by the valve. Although not shown, valve may be adapted to be under the control of controller 41 as well, although the control of flow to tank 11 through controlled valve 17 may be sufficient. During the entire flight, moreover, the oxygen partial pressure in the ullage is measured by the oxygen probe 51 in the receptacle or shroud 59 and the information about oxygen content of the ullage volume is read by spectrometer 43 so that nitrogen can be fed through line 15 controlled by solenoid valve 17 to the tank to maintain the desired low partial pressure of oxygen in the tank. As indicated above, the gas pressure in tank 11 is slightly above ambient, and when nitrogen flow occurs through line 15, the oxygen rich gas in the ullage volume is purged through vent line 42. Heated gases from source 33 (e.g., engine waste gas) under the control of controller 41 through spectrometer 43 which can modulate the flow of heated gas through valve 36 in response to the temperature sensed by temperature sensor 34, maintain the shroud at a relatively constant temperature. The shroud temperature control may be otherwise maintained using an electric resistance heater with resistance wires embedded in a solid core and surrounding the probe 51, but otherwise conforming to the general configuration shown in FIG. 2. Hence, the system can provide an efficient way to maintain a low oxygen content in the tank at all times during a flight from taxi to landing.

Adapting the system to the monitoring of cargo holds will also be apparent to those of skill in the art. The cargo holds may be equipped with probes in accordance with this invention or with more conventional smoke detectors, response to which would cause the system to flood the hold volume where any difficulties might be detected with nitrogen.

The foregoing discussion of specific embodiments of the instant invention should not be considered limiting, and those of skill in the art will understand that variations in the configuration of components may be made without affecting the spirit and scope of the invention disclosed. For example, the valving system that is employed to conduct nitrogen or other inert gas to the tank may be varied as will be apparent. As another example, the uniform temperature shrouds might be located outside the tank being monitored with samples being taken from within the tank and conducted to an oxygen detectors or multiple oxygen detectors maintained in a uniform temperature environment. Under such conditions sampling may be continuous to multiple detectors or sampling might be sequential of the tanks using one or a few detectors to minimize uniform temperature requirements. If the detector unit is maintained in the pressurized and temperature-controlled environment of the passenger cabin or cockpit of an aircraft, it would be possible to conduct samples continuously or intermittently from the tanks being monitored to a central oxygen-content measuring station in, for example, the cabin where an oxygen detector in accord with this invention would maintain a constant watch on oxygen partial pressure within the fuel tanks to maintain the vapors in a relatively non-explosive condition. Such an arrangement would simplify the effort needed to maintain the probe at a uniform temperature since cabin temperatures do not fluctuate as widely as tank temperatures during flight. Finally, it will be apparent that the instant system could be readily adapted to render inert the fuel tank of another type of vehicle, such as a combat vehicle where the fuel tank is subject potentially explosive occurrences in the tank. Hence the disclosure herein which is directed to those of skill in the art should not be considered limiting but should be considered exemplary and the invention shall be defined by the claims.

What is claimed is:

1. An on-board fuel inerting system for a vehicle subject to electrical sparking or other intrusion of potentially explosive occurrences within a fuel tank of the vehicle which comprises: (a) an oxygen partial pressure detector maintained in contact with the vapors in the ullage of the fuel tank; (b) a source of inert gas maintained on-board the vehicle in valved communication with the ullage volume of the fuel tank, the source of inert gas being pressurized swing absorption; and (c) a controller responsive to the detection of a partial pressure of oxygen within said ullage volume that is higher than a predetermined level to cause inert gas to flow into the ullage volume from said source to establish the oxygen partial pressure in said volume at a lower level.

2. The system of claim 1 wherein said inert gas is nitrogen.

3. The system of claim 1 wherein the oxygen partial pressure detector is a fiberoptic detector which detects oxygen partial pressure by detecting the effects of oxygen on the fluorescence of a material maintained on the probe and subjected to contact with the ullage volume vapors.

4. The system of claim 3, wherein the on-board inerting system is aboard an aircraft and wherein an oxygen partial pressure probe is maintained in a receptacle capable of being maintained at a substantially uniform temperature throughout a flight of the aircraft.

5. An on-board fuel inerting system for an aircraft subject to electrical sparking or other intrusion of potentially explosive occurrences within a fuel tank of the aircraft which comprises: (a) an oxygen partial pressure detector maintained in contact with vapors in a ullage volume of the fuel tank; (b) a source of inert gas maintained on-board the vehicle in valved communication with the ullage volume of the fuel tank, the source of inert gas being hollow fiber membrane technology; and (c) a controller responsive to detection of a partial pressure of oxygen within said ullage volume that is higher than a predetermined level to cause inert gas to flow into the ullage volume from said source to establish the oxygen partial pressure in said volume at a lower level.

6. The system of claim 5 wherein said inert gas is nitrogen.

7. The system of claim 6 wherein the oxygen partial pressure detector is a fiberoptic detector where the fiber optic detector detects oxygen partial pressure by detecting the effects of oxygen that exist in the vapors within the ullage volume on a fluorescence of a material maintained on a probe and subjected to contact with the ullage volume vapors.

8. The system of claim 7, the system further including (d) a uniform temperature receptacle, the uniform temperature receptacle surrounding a portion of a fiberoptic probe, the uniform temperature receptacle being in contact with said ullage volume to stabilize a temperature of the probe at a substantially constant temperature throughout a flight.

9. The system of claim 8 wherein the uniform temperature receptacle surrounds an oxygen-measuring region of the probe to create a volume of relatively constant temperature.

10. The system of claim 9 wherein the probe extends into the ullage volume of the aircraft fuel tank and said uniform temperature receptacle is a heated shroud surrounding said fiberoptic probe.

11. The system of claim 10 wherein the oxygen-measuring region of said probe is surrounded by a guard that permits entry of vapor in the ullage volume to exist in proximity to the oxygen-measuring region of the probe wherein the guard protects the probe from contact with liquid fuel within the tank.

12. An on-board fuel inerting system for a fuel tank of an aircraft subject to electrical sparking or other intrusion of potentially explosive occurrences within the fuel tank which comprises: (a) an oxygen partial pressure detector maintained in contact with the vapors in the ullage of the fuel tank; (b) a source of liquid nitrogen gas maintained on-board the vehicle in valved communication with the ullage volume of the fuel tank, said source containing an amount of gas sufficient double the amount needed to flood the ullage of said fuel tank, the source of inert gas being hollow fiber membrane technology; and (c) a controller responsive to the detection of a partial pressure of oxygen within said ullage volume that is higher than the proportion that would support combustion to cause inert gas to flow into the ullage volume from said source to establish the oxygen partial pressure in said volume at a lower level.

* * * * *